March 9, 1937.    P. H. BATTEN ET AL    2,072,852
CLUTCH
Filed Jan. 10, 1935    3 Sheets-Sheet 1

Inventors.
Percy H. Batten and
William J. Pearmain

March 9, 1937. P. H. BATTEN ET AL 2,072,852
CLUTCH
Filed Jan. 10, 1935   3 Sheets-Sheet 3

Inventors:
Percy H. Batten and
William J. Pearmain
by Rector, Hibben, Davis & Macauley
Attys.

Patented Mar. 9, 1937

2,072,852

UNITED STATES PATENT OFFICE 2,072,852

CLUTCH

Percy H. Batten and William J. Pearmain, Racine, Wis., assignors to Twin Disc Clutch Company, Racine, Wis., a corporation of Wisconsin Application January 10, 1935, Serial No. 1,141

9 Claims. (Cl. 192—75)

Our invention relates to clutches of the internally expanding type and more particularly to a device of this character employing one or more shoes which are adapted for frictional contact with a cooperating part, such as a drum.

One object of our invention is to devise a clutch of the pivoted shoe type in which provision is made for removal of the shoes for inspection, or to renew the friction facings, without disturbing the operating mechanism or other parts of the clutch.

A further object is to provide a clutch of the character indicated in which the pivot connections on each shoe are designed to provide a maximum wearing area and to lessen the possibility of the joints becoming tight and interfering with the free action of the shoes.

A further object is to devise a spring-loaded, shoe clutch which is constructed and arranged to secure a substantially direct application of spring pressure to the shoes, thus eliminating the usual transfer mechanism involving the use of links, levers and similar devices.

A further object is to provide a clutch of the internal expanding type having a plurality of shoes which, together with their associated parts, are symmetrically disposed around the shaft, so that the clutch can be adapted for running in either direction by simply rearranging the several parts.

These and further objects of our invention will be set forth in the following specification, reference being had to the accompanying drawings, and the novel means by which said objects are effectuated will be definitely pointed out in the claims.

Figure 3:
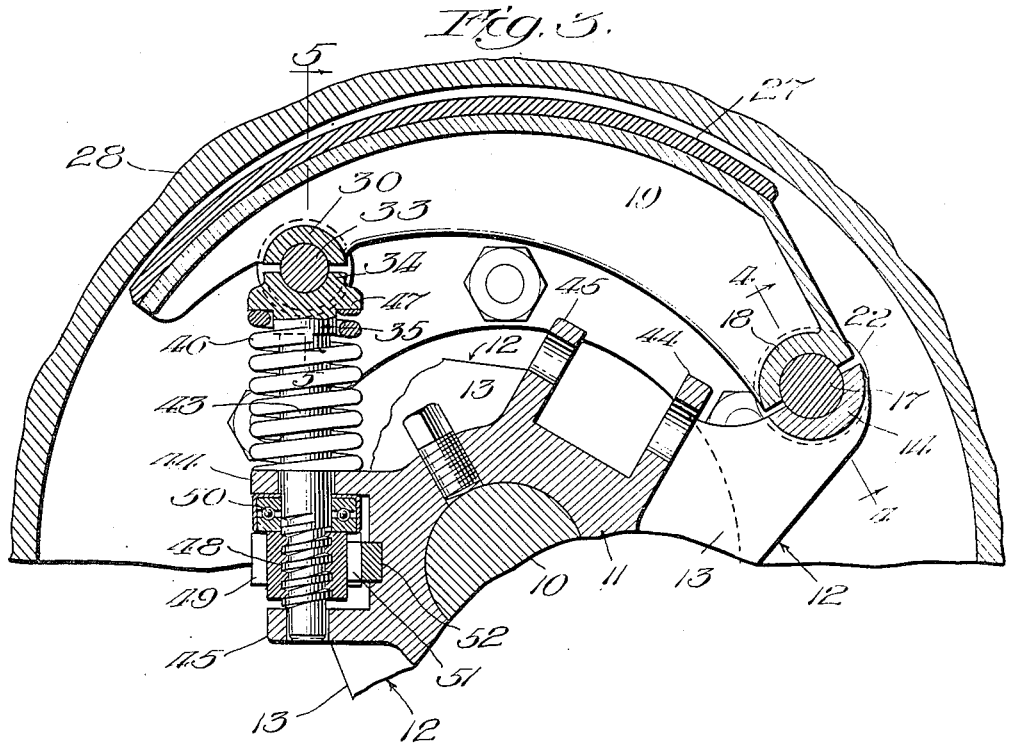
Fig. 3 is a sectional elevation, corresponding to that illustrated in Fig. 1, but only showing a fragment of the clutch to include one shoe and the operating mechanism therefor, the shoe being illustrated in its released position.
Figure 4:
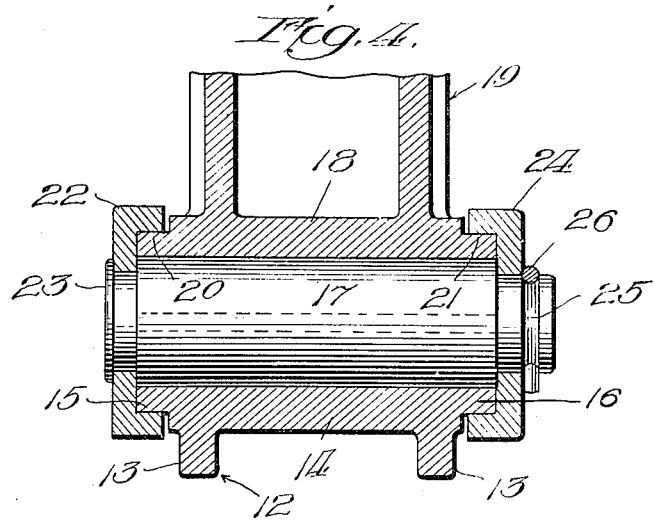

Figs. 4 and 5 are sections along the lines 4—4 and 5—5, respectively, in Fig. 3, looking in the direction of the arrows and showing the open pivot construction employed.

Figure 2:
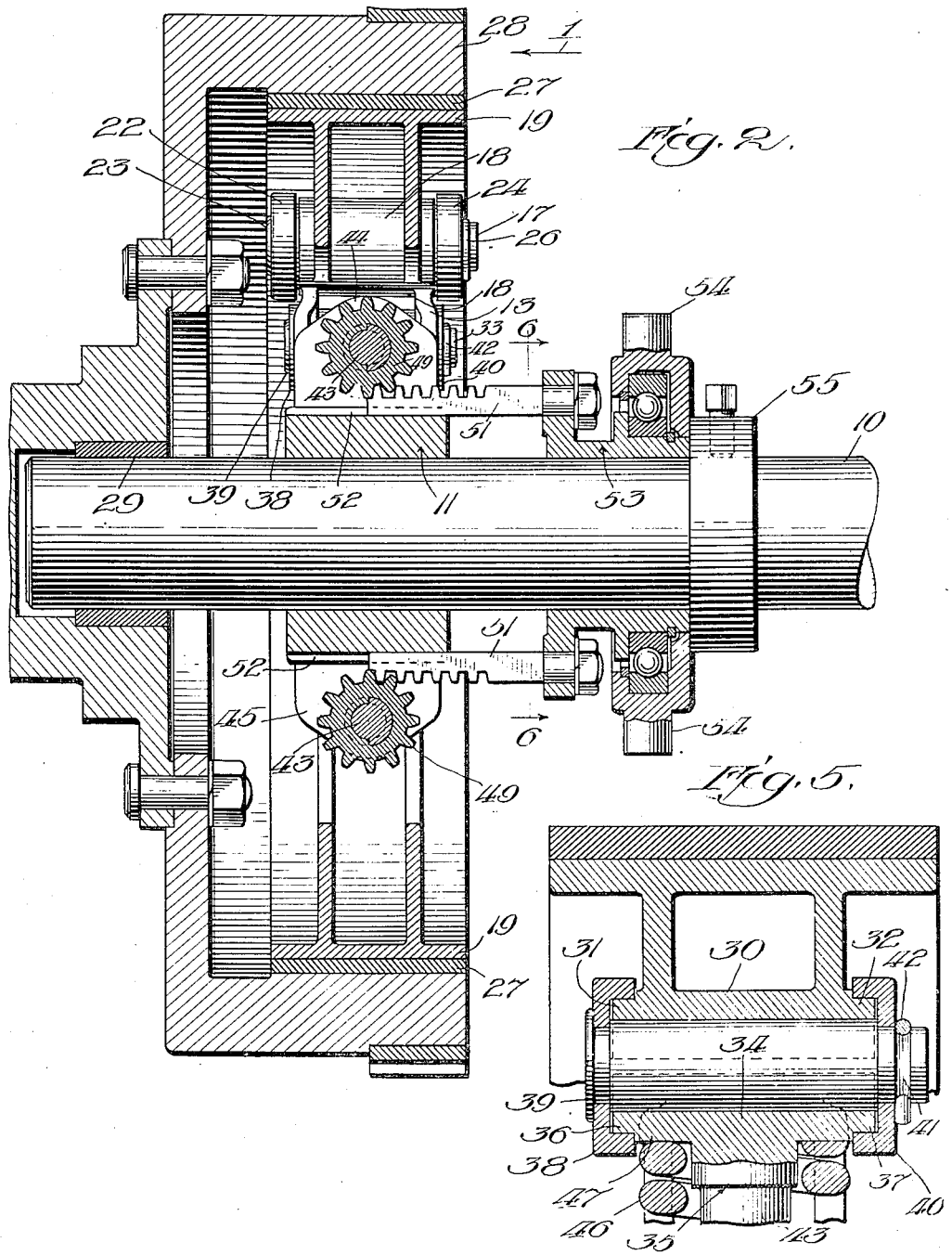
Fig. 2 is a sectional view along the line 2—2 in Fig. 1, looking in the direction of the arrows, and showing the mechanism for moving the shoes into working and release positions.

Fig. 6 is a section along the line 6—6 in Fig. 2, looking in the direction of the arrows, and showing the circumferential disposition of the racks which are carried by the shifting collar.

Figure 1:
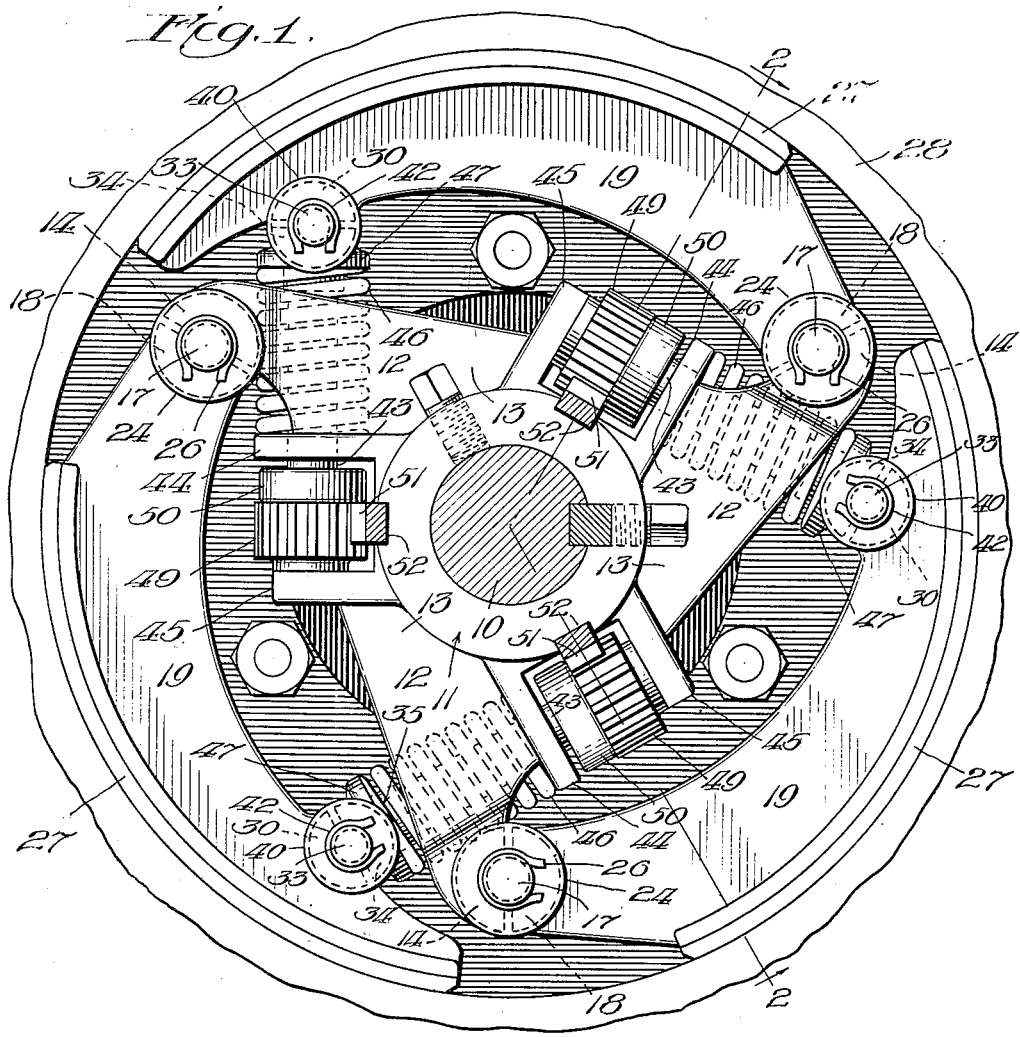
Figure 1 is an end elevation of our improved clutch, as viewed generally in the direction of the arrow 1 in Fig. 2, and showing the shoes in engagement with a drum.

Referring more particularly to Figs. 1, 2 and 4, the numeral 10 designates a shaft which may be considered as the driving or driven element of the clutch, dependent upon the conditions of operation and the manner in which the clutch shoes, hereinafter described, are placed. In the particular arrangement indicated, the shaft 10 is a driven shaft. Keyed or otherwise secured to the shaft is a hub 11 and projecting radially from and equi-spaced therearound is a plurality of brackets 12. Each bracket comprises a pair of spaced ribs 13 which terminate at their outer ends in a parti-cylindrical bearing 14 having similarly shaped shoulders 15 and 16 at the opposite ends thereof. Preferably, the bearing 14 is formed with a nearly semi-cylindrical bearing surface.

A pivot pin 17 is journalled in the bearing 14 and also in a parti-cylindrical bearing 18 formed on the end of a clutch shoe 19. The surface of the bearing 18 is also less than semi-cylindrical in extent and its opposite ends are formed as correspondingly shaped shoulders 20 and 21 for cooperation with the shoulders 15 and 16, respectively. A retaining washer 22 is slipped over the shoulders 15 and 20 to retain the clutch shoe and the pivot pin in position on the bracket 12, while the adjacent end of the pin 17 is reduced in diameter to pass through a suitable aperture in the washer 22 and is riveted as at 23 in order to permanently retain the washer 22 in the position indicated. At the opposite end of the pin 17, a second retaining washer 24 engages the shoulders 16 and 21, while the adjacent end of the pin is reduced in diameter to pass through an aperture in the washer 24 and externally of the latter is provided with an annular groove 25 for receiving a spring clip 26 which may have any desired formation. However formed, it is intended that the clip 26 may be easily removed for a purpose hereinafter explained. From the foregoing, it will be understood that the shoe 19 may swing freely on the pivot pin 17 and within the washers 22 and 24.

Each shoe is provided in the usual manner with friction facings 27 which are intended to engage with the annular, internal surface of a drum 28, within which one end of the shaft 10 may be journaled as at 29. For the arrangement of the clutch shoes as indicated, it will be understood that the drum 28 will be connected to a suitable driving member and will therefore constitute the driving member of the clutch. The facings 27 may be composed of metallic or non-metallic material.

The end of each clutch shoe, remote from the pivot pin 17 which for the conditions assumed, is the trailing end of the shoe, is provided with a parti-cylindrical bearing 30 having like shoulders 31 and 32 at the opposite ends thereof. This bearing is also formed with a surface less than that of a semi-cylinder of equal diameter. A pivot pin 33 is journaled in the bearing 30 and also in a parti-cylindrical bearing 34 provided on one end of an operating screw 35. This bearing also includes a surface less than that of a semi-cylinder of equal diameter and its ends are like shaped as shoulders 36 and 37. As in the case of the pivot construction for each shoe, a retaining washer 38 fits over the shoulders 31 and 36 and the adjacent end of the pivot pin 33 is reduced in diameter and projected through an aperture in the indicated washer for riveting as at 39 in order to retain the indicated washer in the position shown. At the opposite end of the indicated pivot pin, a retaining washer 40 fits around the shoulders 32 and 37, while the adjacent end of the pin is reduced in diameter and extends through an aperture in the washer 40 and is provided externally of the last named washer with an annular groove 41 for receiving a spring clip 42 similar in construction to the clip 26 and intended for a similar purpose.

Extending away from the bearing 34, each operating screw 35 is formed as a stem 43 which extends loosely through and is guided in a pair of spaced arms 44 and 45 which project from and are preferably formed integrally with the hub 11.

The arms 44 and 45 are arranged in pairs as shown around the hub 11 in alternating relation to the brackets 12. In order to strengthen the hub structure, these arms are bridged and form web-like members between the ribs 13 of the immediately adjacent brackets 12, respectively. A loading spring 46 encircles the stem 43 with one end thereof bearing against the outer surface of the arm 44 and the opposite end bearing against the under surface of a shoulder 47 provided on the shoe end of the operating screw 35. It will be noted that each stem 43 and the associated spring 46 extends between the ribs 13 of that bracket 12 which occupies a rotationally retarded position with respect to that bracket 12 which supports that shoe 19 which is actuated by the operating screw 35 in question.

Between the arms 44 and 45, the stem 43 is threaded as at 48 and rotatably mounted on this threaded portion is a pinion 49. Sufficient space is provided between the adjacent faces of this pinion and the arm 44 to mount on the stem 43 a thrust bearing 50. Each pinion 49 meshes with a rack 51 which is endwise slidable in a slot 52 provided on the periphery of the hub 11. The outer extremities of the racks 51 are secured to a shifting collar 53 provided with the usual trunnions 54 by which this collar is shifted along the shaft pin. A stop collar 55 may be suitably anchored on the shaft 10 in order to limit the outward movement of the sleeve 53 and thereby insure that the racks 51 will maintain their engagement with the pinions 49 in the release position of the clutch.

The operation of our improved clutch and the manner of releasing the same will now be described.

As shown in Figs. 1 and 2, the clutch shoes are engaging the drum 28, with the hub 11 operating in a clockwise direction for the arrangement of shoes as shown. In such position, the extending pressure of the springs 46 maintains a continuous pressure against the clutch shoes, thus serving to retain the latter in proper engaging position with the drum. This spring pressure is additive to that shoe pressure against the drum which is due to the centrifugal action of the shoes tending to swing about the pivot pins 17. This action is assisted by reason of the so-called servo action of each shoe due to the fact that the pivot for each shoe is rotationally in advance thereof and so tends to draw the toe of the shoe into closer contact with the drum.

In releasing the clutch, it is only necessary to move the sleeve 53 toward the hub 11 from the position shown in Fig. 2. This movement of the sleeve 53 rotates the pinions 49, but in its initial phase the pinions are only threaded along the stems 43 until the thrust bearings engage the arms 44. Thereafter, the pinions can only move rotationally around the associated stems, so that the latter are drawn between the arms 44 and 45 to thereby compress the loading springs and move the several clutch shoes to a released position. The loose mounting of the stems 43 in the arms 44 and 45 enable these stems to accommodate themselves readily to the pivoted swing of the clutch shoes 19.

The clutch is engaged by moving the sleeve 53 from the inward position described above to the outward position illustrated in Fig. 2. Each pinion 49 is thereby rotated from the position illustrated in Fig. 3 to that shown in Fig. 1, thus permitting the associated loading spring 46 to move the stem 43 and the connected shoe into driving engagement with the drum.

One of the most important features of our improved clutch is the type of pivot connection employed in mounting each shoe on the hub and in securing each shoe to the operating screw 35. Both of these pivots are of the so-called open type, as contrasted with the usual hinge and pin type. The latter construction frequently binds and becomes tight and, further, does not provide the maximum area for wear. In our construction, it is possible to provide pivot pins with large bearing surfaces and to so shape and arrange the bearing surfaces on the shoes, supporting brackets, and the ends of the operating screws that substantially the total surface of each pivot pin does service as a bearing area. For example, in a 14 inch clutch, it has been ascertained that the shoe pivot pin may have a length of 2¾ inches and a diameter of approximately 1 inch, while the pivot pin for each operating screw may have a length of 2¼ inches and a diameter of approximately ¾ of an inch. Pins of such a size provide an exceptionally large area for wear.

The open type of pivot construction also enables the clutch shoes to be easily removed in order to replace the friction facings without requiring any substantial disassembly of the other portions of the clutch. For example, it is only necessary to retract the shoes to the positions indicated in Fig. 3, remove the spring clips 26 and 42, and then withdraw the retaining washers 24 and 32, after which each clutch shoe may be simply removed by endwise movement along the pivot pins 17 and 33.

As an additional feature, the substantially direct application of the spring pressure to each shoe completely eliminates any necessity for the rather complicated and otherwise usual assembly of links and levers for transmitting loading pressure to the shoes. The directional axis of each loading spring is remote from the pivot of the associated shoe and is generally normal to a chord beginning at the leading end of the curvature of the shoe and subtending the major portion of the arc thereof. The spring pressure is therefore in a direction to insure the most effective engagement of the clutch shoes with the drum, regardless of any eccentricity in the wearing face of the latter. Moreover, it will be particularly noted that this spring pressure is additive to the centrifugal force operating on each shoe and tending to swing the same about its own pivot into engagement with the working surface of the drum. It is well known that a shoe clutch is more efficient when the pivot end of the shoe leads the shoe proper in a rotational sense. This constructional feature is incorporated in our clutch, as already clearly shown above, and the ensuing action is such as to draw the toe of the shoe into closer contact with the drum surface.

Because of the symmetrical construction of the clutch shoes, the hub and its associated brackets and arms, the clutch may be operated in either a clockwise or a counter-clockwise direction by suitably positioning the hub on the supporting shaft. In Fig. 1, the clutch is assembled for a clockwise direction, but by reversing the position of the hub on the shaft, the clutch will operate just as effectively in the opposite direction, that is, with the shaft 10 operating as the driving shaft.

We claim:

1. In a clutch of the internally expanding type having a drum constituting a friction part, the combination of a hub, a friction shoe swingably mounted on the hub for engagement with the drum, a stem pivotally connected at one end to the shoe with its opposite end slidable through an arm on the hub, means for actuating the stem to move the shoe to release position, and a loading spring between the arm and shoe tending to move the shoe into engagement with the drum.

2. In a clutch of the internally expanding type having a drum constituting a friction part, the combination of a hub, a friction shoe swingably mounted on the hub for engagement with the drum, a stem having a shoulder pivotally connected at one end to the shoe with its opposite end slidable through an arm on the hub, means for actuating the stem to move the shoe to release position, and a coil loading spring encircling the stem between the shoulder and arm tending to move the shoe into engagement with the drum.

3. In a clutch of the internally expanding type having a drum constituting a friction part, the combination of a hub having an arm, a friction shoe swingably mounted on the hub for engagement with the drum, a stem having a shoulder pivotally connected at one end to the shoe and having its opposite end threaded and slidable through the arm, a coil loading spring encircling the stem between the shoulder and arm, and nut means rotatable on the threaded stem portion to move the shoe to release position.

4. In a clutch of the internally expanding type having a drum constituting a friction part, the combination of a hub having an arm, a friction shoe swingably mounted on the hub for engagement with the drum, a stem having a shoulder pivotally connected at one end to the shoe and having its opposite end threaded and slidable through the arm, a coil loading spring encircling the stem between the shoulder and arm, and nut means rotatable on the threaded stem portion to move the shoe to release position, the nut means being spaced from the arm which contacts the spring when the shoe is in working position to thereby secure the full working pressure of the spring up to the limit of movement of the shoe.

5. In a clutch of the internally expanding type having a drum constituting a friction part, the combination of a hub having an arm, a friction shoe swingably mounted on the hub for engagement with the drum, a stem having a shoulder pivotally connected at one end to the shoe and having its opposite end threaded and slidable through the arm, a coil loading spring encircling the stem between the shoulder and arm, a pinion threaded on the stem portion to move the shoe to release position, and a rack slidable on the hub and meshing with the pinion to rotate the same.

6. In a clutch of the internally expanding type having a drum constituting a friction part, the combination of a hub having an externally disposed, parti-cylindrical bearing, a pivot pin mounted in the bearing, a friction shoe having a parti-cylindrical bearing resting on the pin and a second parti-cylindrical bearing remote from the pin, a second pivot pin in the second bearing, a stem having at one end a shoulder and a parti-cylindrical bearing contacting the second pin with its opposite end slidable through an arm on the hub, retaining washers mounted on the ends of both pivot pins and engaging the ends of the respective bearings for maintaining the parts in assembled relation, one washer on each pin being detachable to permit the easy removal of the shoe when in released position, means for actuating the stem to move the shoe to release position, and a loading spring interposed between the arm and shoulder and tending to move the shoe into engagement with the drum.

7. In a clutch of the internally expanding type having a drum constituting a friction part, the combination of a hub, a friction shoe having a curved working surface swingable at one end on the hub for engagement with the drum, and yielding means interposed between the hub and the shoe and bearing directly on the hub for actuating the shoe into drum engagement, the directional axis of the means being remote from the shoe pivot and being generally normal to a chord beginning at the leading end of the surface curvature and subtending the major portion thereof.

8. In a clutch of the internally expanding type having a drum constituting a friction part, the combination of a hub, a friction shoe having a curved working surface swingable at one end on the hub for engagement with the drum, and a coil spring actuating the shoe into drum engagement, one end of the spring bearing directly on the hub, the directional axis of the spring being remote from the shoe pivot and being generally normal to a chord beginning at the leading end of the surface curvature and subtending the major portion thereof.

9. In a clutch of the internally expanding type having an annular friction part, the combination of a hub, a friction shoe swingably mounted on the hub for engagement with the drum, a stem pivotally connected at one end to the shoe with its opposite end slidable through an arm on the hub, a coil loading spring encircling the stem between the arm and shoe for moving the shoe into contact with the part, and means for shifting the stem to withdraw the shoe against the compression of the spring.

PERCY H. BATTEN.
WILLIAM J. PEARMAIN.